C. F. GRAINGER.
REGISTERING MACHINE.
APPLICATION FILED JULY 5, 1911.

1,085,413.

Patented Jan. 27, 1914.

5 SHEETS—SHEET 1.

Witnesses:
M. F. Gannett
D. W. Edelin

Inventor:
Charles F. Grainger
by Victor J. Evans
Atty.

C. F. GRAINGER.
REGISTERING MACHINE.
APPLICATION FILED JULY 5, 1911.

1,085,413.

Patented Jan. 27, 1914.
5 SHEETS—SHEET 3.

Witnesses
D. B. Galt.
H. H. Hoster.

Inventor
Charles F. Grainger,
By Victor J. Evans.
Attorney

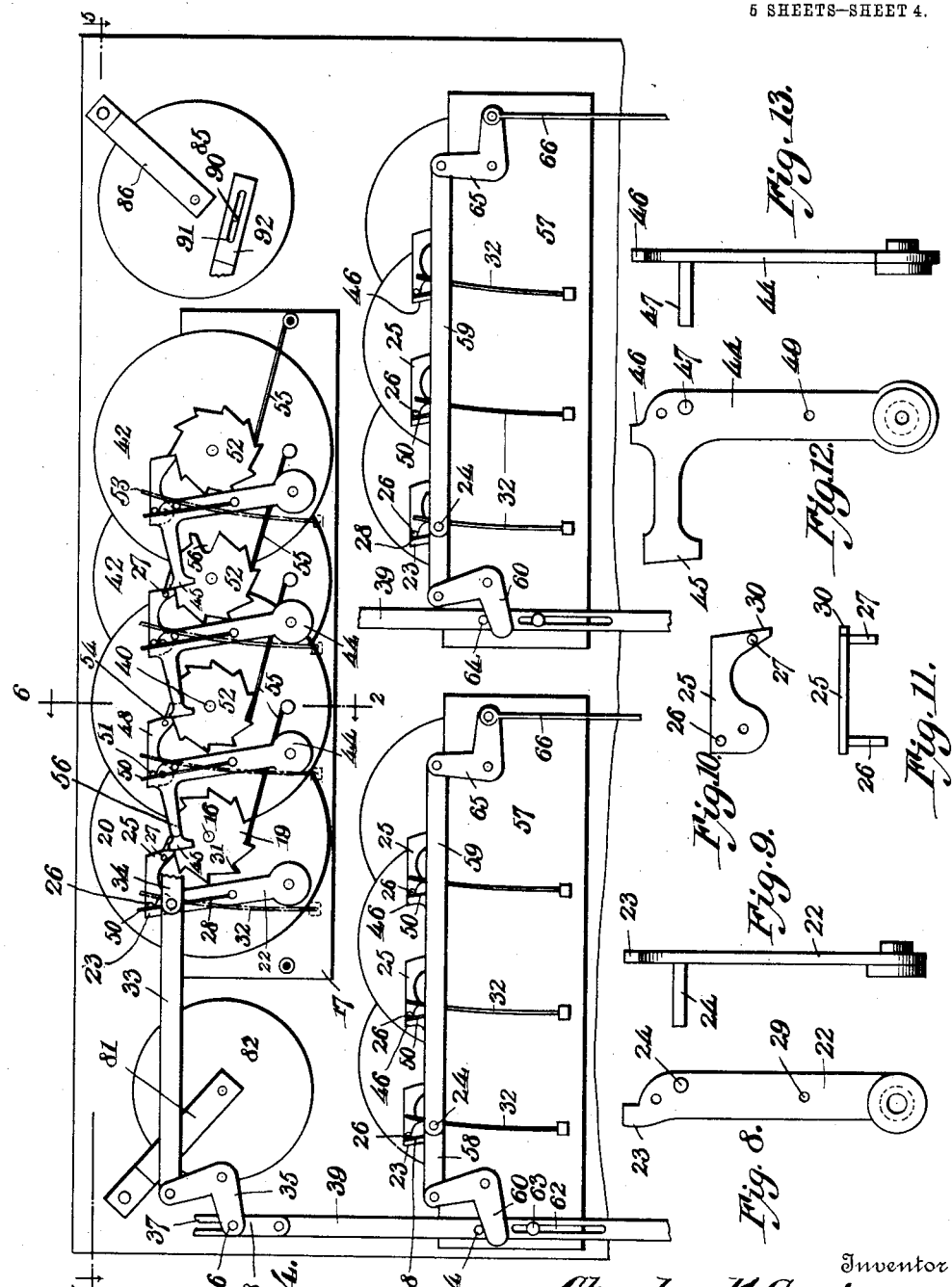

C. F. GRAINGER.
REGISTERING MACHINE.
APPLICATION FILED JULY 5, 1911.
1,085,413.
Patented Jan. 27, 1914.
5 SHEETS—SHEET 5.
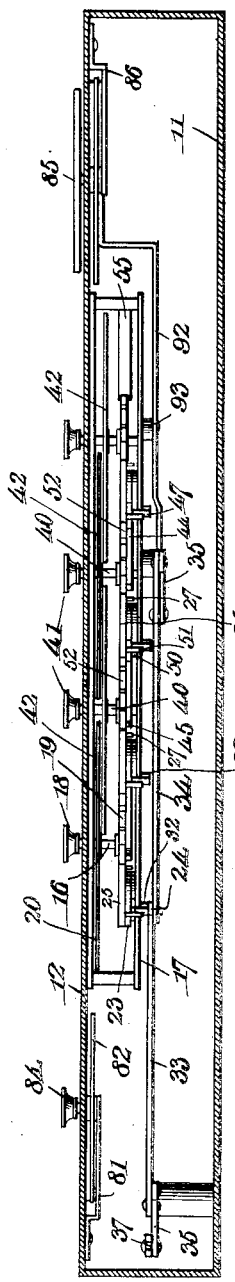
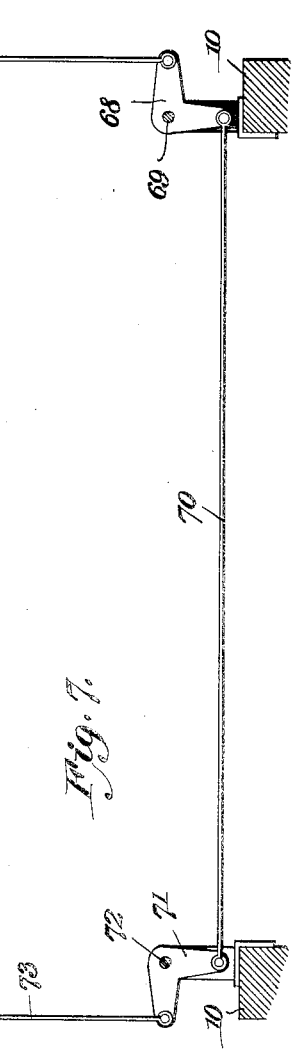
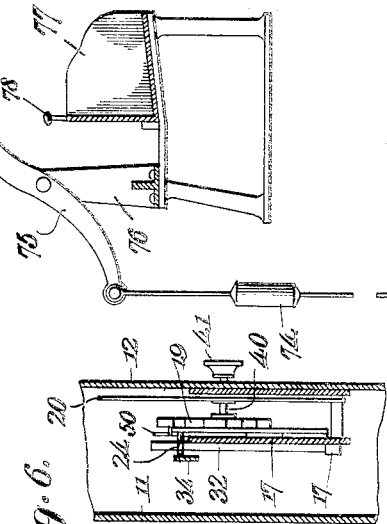
Inventor
Charles F. Grainger,
By Victor J. Evans
Attorney
Witnesses

UNITED STATES PATENT OFFICE.

CHARLES F. GRAINGER, OF LOUISVILLE, KENTUCKY, ASSIGNOR TO GRAINGER AND COMPANY, OF LOUISVILLE, KENTUCKY, A CORPORATION OF KENTUCKY.

REGISTERING-MACHINE.

1,085,413.     Specification of Letters Patent.     Patented Jan. 27, 1914.

Application filed July 5, 1911. Serial No. 636,894.

*To all whom it may concern:*

Be it known that I, CHARLES F. GRAINGER, a citizen of the United States, residing at Louisville, in the county of Jefferson and State of Kentucky, have invented new and useful Improvements in Registering-Machines, of which the following is a specification.

An object of the invention is to provide a registering machine for registering the totals of individual items and for registering the sum total of all the items.

My device is particularly adapted for use in connection with racing events and embodies a structure which discloses to the observer the name or number of the event, the name of each entrant, the individual status of each entrant or the support which each entrant receives and the summary of the status of all the entrants.

For the purpose mentioned, use is made of a booth, in which an operator is stationed, an indicator for indicating an event and the conditions thereof, means mounted within the booth and connected with the indicator so that the operator can control the same and locking means for locking the mechanism of the indicator.

Reference is to be had to the accompanying drawings constituting a part of this specification, in which similar characters of reference denote corresponding parts in all the views, and in which—

Figure 1:
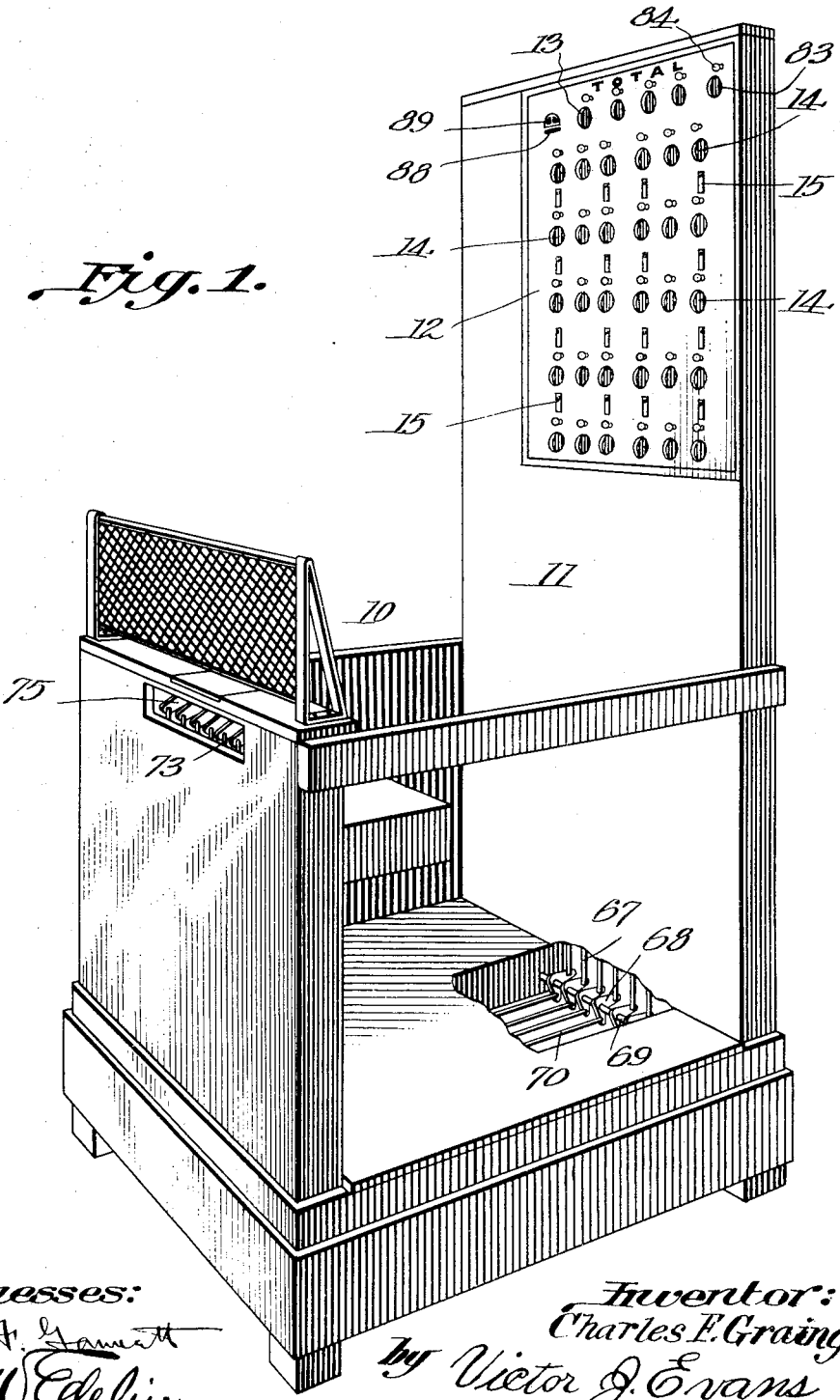
Figure 2:
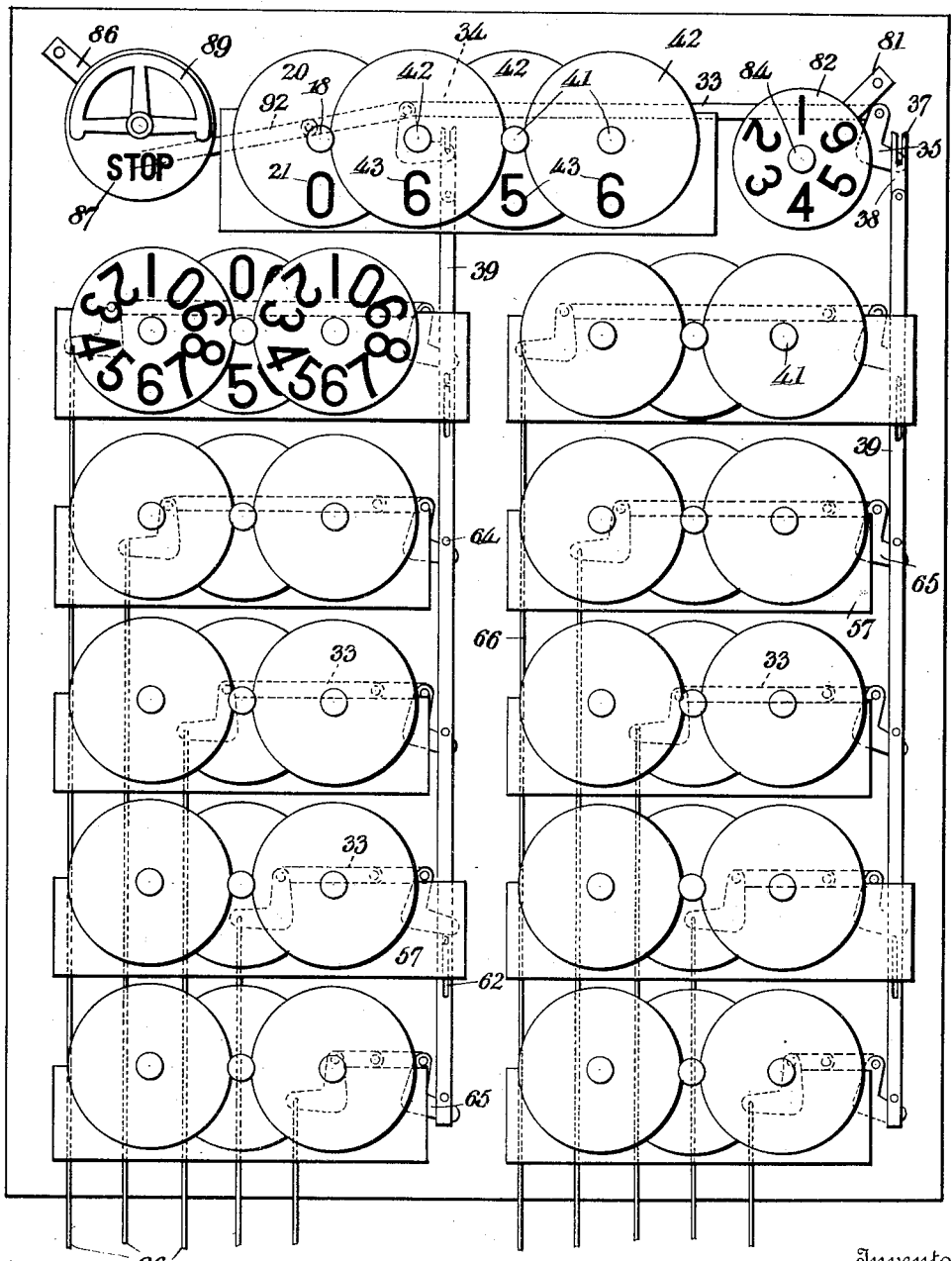
Figure 3:
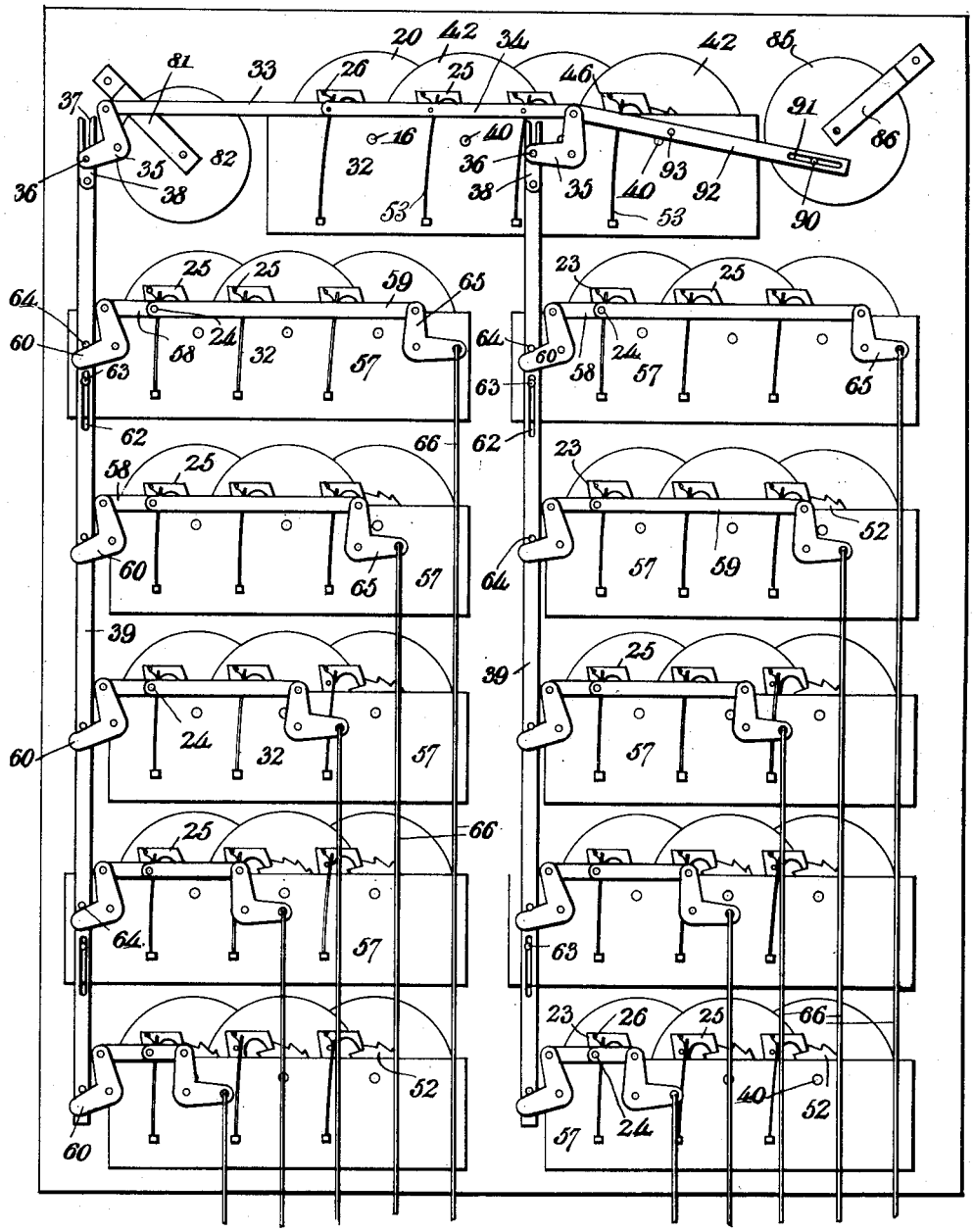

Figure 1 is a perspective view of the apparatus, parts being broken away to disclose the underlying structure. Fig. 2 is a front elevation of the indicator, the front panel thereof being removed. Fig. 3 is a rear elevation of the indicator, the rear panel thereof being removed. Fig. 4 is a fragmentary enlarged rear elevation of a portion of the indicator, parts being broken away to disclose the underlying structure. Fig. 5 is a horizontal sectional view taken on the line 5—5 in Fig. 4, looking in the direction of the arrow. Fig. 6 is a fragmentary vertical sectional view taken on the line 6—6 in Fig. 4, looking in the direction of the arrow. Fig. 7 is a fragmentary side elevation of a portion of the operating mechanism for operating the indicator. Fig. 8 is a rear elevation of the prime operating lever. Fig. 9 is an end elevation of the lever disclosed in Fig. 8. Fig. 10 is a rear elevation of one of the dogs. Fig. 11 is a plan view of the dogs shown in Fig. 10. Fig. 12 is a rear elevation of one of the L-shaped operating levers. Fig. 13 is an end elevation of the L-shaped lever shown in Fig. 12.

Referring to the views, and more particularly to Fig. 1, I provide a booth 10 having a rear wall 11 provided with an indicator board 12, the indicator board near the top thereof being provided with a horizontal row of apertures 13 and at spaced distances below the spaced row of apertures 13, the indicator board is provided with rows of spaced apertures 14, leaf springs 15 being secured to the indicator board between the rows of apertures 14, for a purpose that will be hereinafter more fully disclosed.

Referring to Figs. 4 and 5 I provide a totalizing mechanism embodying a shaft 16 extended through the indicator board 12 and journaled in a frame 17, the outer end of the said shaft having an operating knob 18 secured thereto. Keyed to the shaft 16 is a ratchet wheel 19 and mounted to turn with the shaft is a dial 20, the said dial being provided with members 21 which will register with the apertures 13 so that the members can be seen from the front of the booth by looking through one of the apertures 13. Pivotally mounted on the frame 17 is a lever 22 having a lug 23 formed on the upper end thereof and provided with a laterally extending pin 24. Pivotally connected to the upper end of the lever 22 is a dog 25 provided at one end with a laterally extending pin 26 and at the other end with a laterally extending pin 27, the pin 26 being engaged by a leaf spring 28 secured to the lever 22 at the point 29, the object of the spring 28 in engagement with the pin 26 being to retain the dog 25 in engagement with the first ratchet wheel 19, the outer end of the dog 25 being provided with a lug 30 which engages the teeth 31 on the ratchet wheel 19 as shown in Fig. 4. Secured to the frame 17 is a leaf spring 32 having the upper end thereof engaging the pin 24 and the pin 24 pivotally connects rods 33, 34 so that the spring 32 will be positioned between the dog 25 and the rods 33, 34. The outer ends of the rods 33, 34 are pivotally connected to bell crank levers 35 provided with pins 36 adapted to operate in slots 37 formed in rods 38 pivotally connected to main rods 39 so that when the main rods 39 are moved upwardly, the horizontal rods 33, 34 will be moved toward the right in Fig. 4, thus operating the dog 25 to rotate the ratchet wheel 19, it being understood that the rod 33 moves against the action of the spring 32 when moved to the right so that the spring 32 will tend to return the rod 33 to normal position when the main rod 39 is released as will be hereinafter more fully brought out in the specification.

In horizontal alinement with the shaft 16 and extended through the indicator board 12 are a series of shafts 40, similar to the shaft 16 and journaled to the frame 17 at their inner ends, the outer ends of the shafts being provided with operating knobs 41 similar to the operating knobs 18 and secured to the shafts 40 are dials 42, the mentioned dials being provided with numbers 43 as shown in Fig. 2, the mentioned numbers being adapted to pass the apertures 13 so that the same can be perceived from the front of the booth when they register with the apertures. Pivotally mounted on the frame 17 are L-shaped levers 44 having heads 45 and lugs 46, pins 47 being extended laterally from the levers 44 as shown in Figs. 12 and 13. Pivotally mounted on the L-shaped levers 44 are dogs 48, similar to the dog 25 and secured to the levers 44 at 49 are springs 50, similar to the spring 28, the said springs being adapted to engage pins 51 on the dogs 48 to retain the dogs in engagement with ratchet wheels 52, similar to the ratchet wheel 19, the ratchet wheel 52 being keyed to the shafts 40 as will be readily understood. Leaf springs 53 are secured to the frame 17 and engage the pins 47 on the L-shaped levers 44 to retain the L-shaped levers 44 in normal position, as will be hereinafter more fully brought out and extended from the dog 48 are pins 54 similar to the pin 27 on the dog 25. Secured to the frame 17 are leaf springs 55 engaging the ratchet wheels 19 and 52, the object of the springs being to retain the ratchet wheels in rigid position until they are operated upon by the dogs 25 and 48.

In the operation of the mechanism described, when the rod 33, shown in Fig. 4, is moved to the right, the pin 24 connecting the rod 33 with the rod 34 and at the same time connecting the rods 33 and 34 to the lever 22 will cause the lever 22 to be operated against the action of the spring 32, thus actuating the dog 25 so that the ratchet wheel 19 will be rotated, thus rotating the dial 20 so that a new number will appear at one of the apertures 13. As mentioned heretofore, the dog 25 is retained in engagement with the ratchet wheel 19 by the leaf spring 28 and any upward movement of the dog 25 is limited by the lug 23 against which the pin 26 of the dog abuts when the dog is in normal position. Now when the rod 33 is permitted to return to normal position by the action of the leaf spring 32, the lug 30 of the dog 25 will slide into engagement with the next tooth on the ratchet wheel as will be readily understood. The ratchet wheels 19 and 52, which have the heads 45 of the L-shaped levers 44 lying adjacent thereto, are provided with notches 56, one notch being preferably provided on each ratchet wheel. Now when the ratchet wheel 19 has been rotated so that the lug 30 of the dog 25 extends into the notch 56, the pin 27 on the dog 25 will abut against the head 45 of the L-shaped lever 44 so that when the rod 33 is moved to the right the L-shaped lever 44 will be operated so that the dog 48 thereon will move the first ratchet wheel 52, thus rotating the second dial so that a new number will appear at one of the apertures 13 in the indicator board 12. This operation is true of those ratchet wheels 52 which operate in conjunction with the heads 45 of the L-shaped levers 44. Thus, it will be seen that the last ratchet wheel 52 need not be provided with a notch 56 inasmuch as the last ratchet wheel will not coöperate with an L-shaped lever 44 as shown in Fig. 4. The ratchet wheels 19 and 52 are each preferably provided with ten teeth and the dials 20 and 42 are preferably provided with numbers from one to ten. Now assuming that the notch in the ratchet wheel 19 is adjacent the tenth tooth, when the lug 30 of the dog 25 falls into the mentioned notch 56 the last numeral on the dial 20 will show through one of the apertures 13. At the same time the next adjacent dial 42 will be rotated so that the second numeral on the dial will appear through one of the apertures 13 and this operation will follow in like manner with the remainder of the dials, it being understood that the second dial will rotate one numeral when the first dial rotates ten numerals, the third dial will rotate one numeral when the second dial rotates ten numerals, and the fourth dial will rotate one numeral when the third dial rotates ten numerals.

As mentioned, heretofore, the shafts 16 and 40 have operating knobs 18 and 41 connected thereto so that by operating the knobs, the dials 20 and 42 can be rotated so that a zero will appear through each of the apertures 13, the dials at this time being in their initial or zero position. At various spaced distances beneath the mechanism described I provide a registering mechanism 57, constructed, arranged and operated similarly to the described mechanism and connected link members 58, 59 are arranged to operate the mechanisms 57 in a similar manner that the described mechanism is operated by the action of the members 33, 25. The outer ends of the link members 58 are pivotally connected to bell crank levers 60 pivotally mounted on the frames of the mechanisms 57 and mounted to slide vertically in the rear wall 11 of the booth 10 are the operating rods 39, mentioned heretofore, the said rods being provided with slots 62 through which pins 63 are slidably received to guide the operating rods 39 in their vertical movement. Extended from the rods 39 are pins 64 each engaging an arm of each of the bell crank levers 60, the upper ends of the operating rods 39 having pivotally connected thereto the slotted rod 38 in which is received one end of the bell crank lever 35, as has been heretofore mentioned. The outer ends of the link members 59 are pivotally connected to bell crank levers 65 mounted on the frames of the mechanisms 57 and pivotally connected to the bell crank levers 65 are actuating rods 66, the said rods being connected to hooked rods 67 having pivotal connection with bell crank levers 68 journaled on a shaft 69 mounted at the lower rear end of the booth 10 and pivotally connected to the bell crank levers 68 are horizontally extending rods 70, the said rods 70 being passed beneath the floor of the booth 10, and connected to bell crank levers 71 journaled on the shaft 72 mounted at the lower front end of the booth 10. Pivotally connected to the bell crank levers 71 are rods 73 provided with weights 74, the upper ends of the said rods being pivotally connected to operating levers 75 mounted to swing on uprights 76. Pockets 77 are provided at the front end of the booth near the top thereof and extending along the upper edge of the pockets 77 is a cushion 78, the said cushion being adapted to limit the downward movement of the ends 79 of the levers 75, the said levers each being provided with presser knobs 80 as will be readily understood. By referring to Fig. 3 it will be seen that the link members 58, 59 vary in length for each mechanism 57 so that the actuating rods 66 will be spaced apart and will not conflict with one another when my device is operated.

In the use of my device, when the same is used in connection with a racing event or the like, the names of the entrants are secured to the indicator board 12 by inscribing the names on cards which are placed beneath the leaf springs 15 to retain the same in place, one of the mechanisms 57 being adapted to register the particular record of each entrant and one of the levers 75 being provided to operate each of the mechanisms 57. The usual tickets are placed in the pockets 77, the ticket of each particular entrant being beneath the lever 75 adapted to operate the mechanism which is adapted to register the record of that particular entrant. Now assuming that all the dials are arranged so that zeros will appear in the apertures 14. When a ticket is purchased for a particular entrant, the lever over the pocket from which the ticket was taken is pressed downwardly by imparting a downward movement on the presser knob 80 and the sale of the ticket will be reported by the numeral 1 appearing in one of the apertures 14, in front of the mechanism 57 employed to register the number of sales of the entrant. Thus each mechanism 57 will register the individual record of each entrant and as each of the mechanisms 57 is connected by the operating rods 39 with the mechanism at the upper end of the indicator board, an individual record and a grand total will be recorded each time that one of the levers 75 is operated. Now by referring to Fig. 1, it will be seen that the individual records will appear through the apertures 14 and the grand total of all the registrations will appear through the apertures 13. The weights 74 are provided on the rods 73 to return the levers 75 to normal position after the same have been pressed downwardly to raise the weights 74 and the cushion 78 is provided to limit the downward movement of the ends 79 of the levers 75 so that the operating rods having connection with the levers cannot in any manner become jammed or deranged as will be readily understood.

Secured to the upper end of the wall 11 and to one side of the totalizing mechanism is a plate 81 having an event dial 82 rotatably mounted thereon, the mentioned dial being provided with a series of numbers arranged so that they can be seen through an aperture 83 in the indicator board 12 and secured to the event dial 82 is an operating knob 84, the said knob being extended exteriorly of the indicator board 12 so that the same can be grasped by the operator to rotate the dial 82. The number on the dial 82, appearing in the aperture 83 designates the particular event in progress at a certain time and the events being preferably designated by numerals, the operator can readily rotate the dial by grasping the operating knob 84 thus disclosing to the observer the number of the particular event which is in progress. Adjacent the other end of the totalizing mechanism a dial 85 is rotatably mounted on a plate 86 secured to the wall 11 and a suitable inscription 87 is placed upon the dial 85 to denote that the entire mechanism of the registering machine is in locked or inoperative position, the inscription being discernible through an opening 88 provided in the indicator board 12 as shown in Fig. 1. A handle 89 is secured to the dial 85 so that the operator can rotate the dial, thus bringing the inscription in register with the opening 88. Secured to the rear of the dial and offset from the center thereof is a pin 90 adapted to operate in a slot 91 formed in the locking bar 92, the said locking bar being pivotally connected to one of the bell crank levers 35 as shown in Fig. 3, the said locking bar 92 being pivotally mounted on the frame 17 at the point 93. Now when the dial 85 is rotated so that the inscription 87 appears in the opening 88, the pin 90 will be positioned in alinement between the center of the dial 85 and the point 93, thus preventing any movement of the operating rods 39 or the link members 33, 34, 58 and 59. By locking the link members and operating rods as mentioned the various connections between the individual mechanism, the total mechanisms and the actuating levers 75 will also be locked, thus preventing any operation of the machine.

Thus it will be seen that a mechanism is provided for indicating an event and the conditions thereof, a totalizing mechanism is provided and adapted to operate in conjunction with the individual mechanisms to indicate the total registration of the individual mechanisms, an indicating means is provided for indicating the various events and locking means are provided for locking the entire machine.

Although my device is preferably adapted for use in connection with racing events and although for the purpose of describing my registering machine I have shown a particular construction thereof, it will be understood that I do not limit myself to the use of the device in connection with racing events and that the scope of the invention is defined in the appended claims.

Having thus fully described the invention, what I claim as new, is:—

1. In a device of the class described, the combination with a booth, of a series of sets of registering mechanisms mounted therein, means for independently operating the said sets of mechanisms, a totalizing mechanism, a connection between the totalizing mechanism and the said sets of mechanisms for registering the totals of the said sets of mechanisms, and a locking dial revoluble on the said booth and having connection with the said sets of mechanisms and said totalizing mechanism for locking the same.

2. In a device of the class described, the combination with a booth, of a series of sets of registering mechanisms mounted therein, means for independently operating the said sets of mechanisms, a totalizing mechanism, a connection between the said totalizing mechanism and the said sets of mechanisms for registering the totals of the sets of mechanisms, a locking dial revoluble in the said booth and having connection with the said sets of mechanisms and said totalizing mechanism for locking the same, and a manually operable handle on the said dial for imparting rotation thereto to move the dial into locking position.

In testimony whereof I affix my signature in presence of two witnesses.

CHARLES F. GRAINGER.

Witnesses:
MARIE C. DREISMAN,
WILLIAM C. BROHM.